L. S. LACHMAN.
PROCESS OF ELECTRIC WELDING.
APPLICATION FILED AUG. 12, 1910.
1,085,089.
Patented Jan. 20, 1914.
4 SHEETS—SHEET 1.
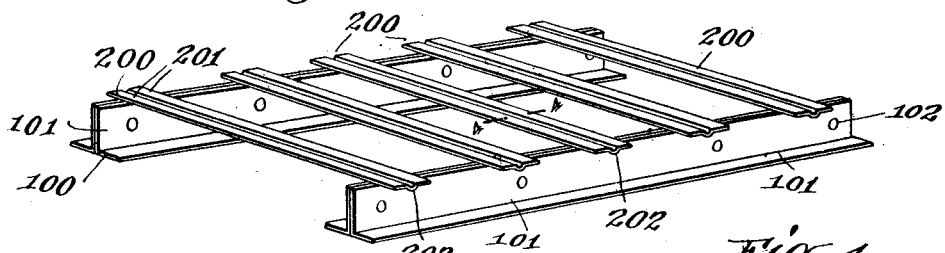
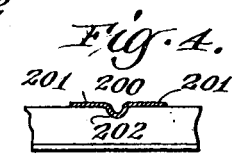
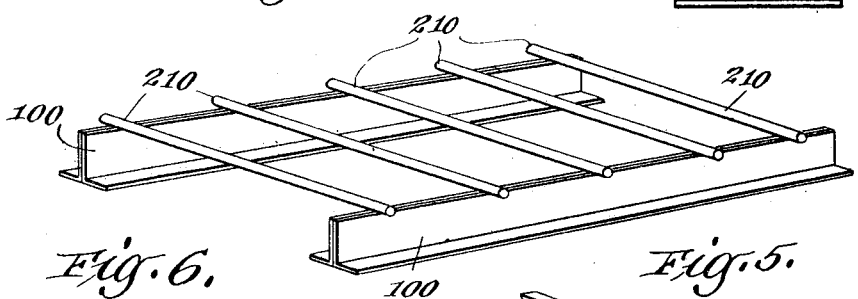
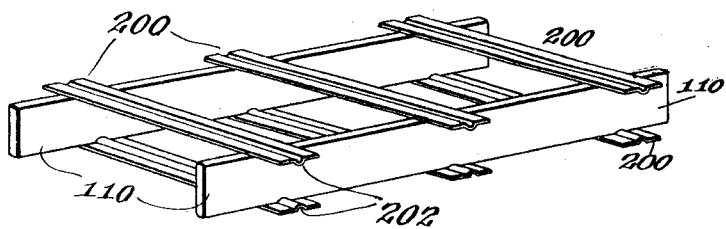
WITNESSES
A. C. O'Connell
Jos. J. Ranagan
INVENTOR
L. S. Lachman
BY
ATTORNEY

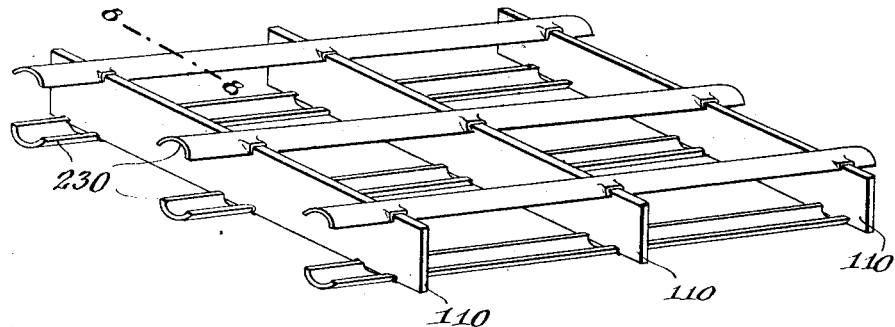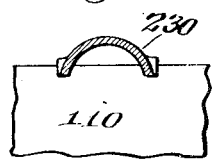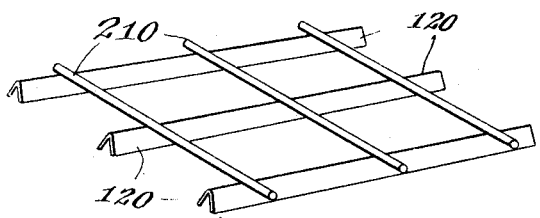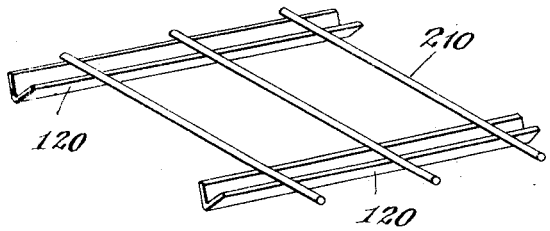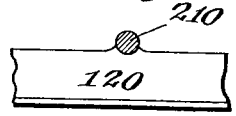

L. S. LACHMAN.
PROCESS OF ELECTRIC WELDING.
APPLICATION FILED AUG. 12, 1910.
1,085,089.
Patented Jan. 20, 1914.
4 SHEETS—SHEET 3.
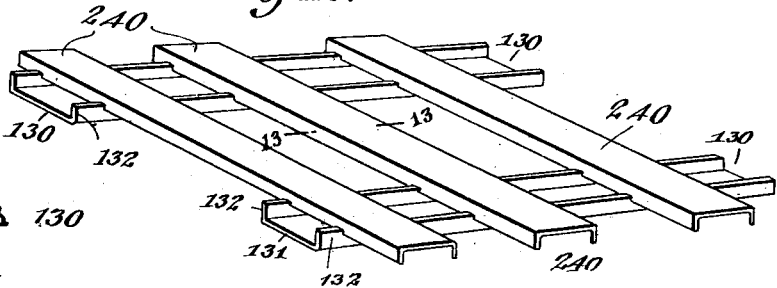
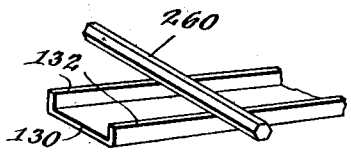
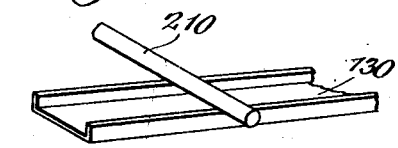
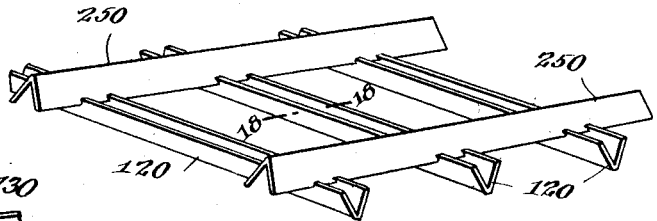
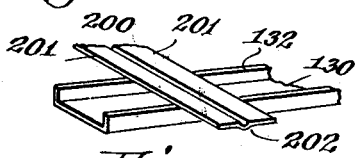
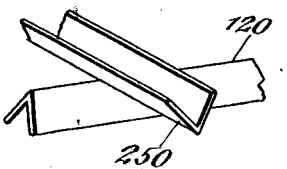
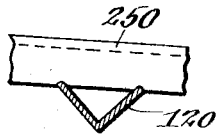
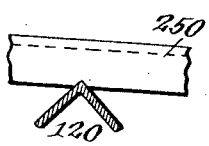
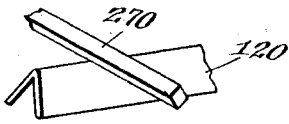
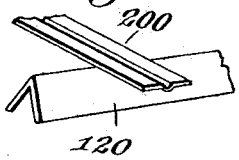
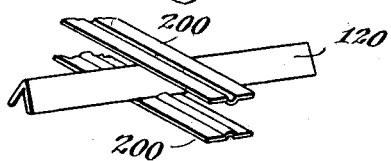
WITNESSES
INVENTOR
L. S. Lachman
BY
ATTORNEY

L. S. LACHMAN.
PROCESS OF ELECTRIC WELDING.
APPLICATION FILED AUG. 12, 1910.

1,085,089.

Patented Jan. 20, 1914.
4 SHEETS—SHEET 4.

WITNESSES
A. C. O'Connell
John J. Ranagan

INVENTOR
L. S. Lachman
BY
Wm. H. Megrath
ATTORNEY

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

PROCESS OF ELECTRIC WELDING.

1,085,089.  Specification of Letters Patent.  Patented Jan. 20, 1914.

Application filed August 12, 1910. Serial No. 576,900.

*To all whom it may concern:*

Be it known that I, LAURENCE S. LACHMAN, a citizen of the United States, and a resident of the city, county, and State of New York, have invented certain new and useful Improvements in Processes of Electric Welding, of which the following is a specification.

This invention relates to processes of electric welding, and has for one of its main purposes the provision of a process whereby longitudinal and transverse members may be most economically welded together, for the purpose of producing a strong and durable frame or net work for various purposes.

Other objects of the invention will appear from the hereinafter description.

In the accompanying drawings there are shown a number of different forms of framework typical of what is contemplated to be within the spirit and scope of the present invention, and it will be noted that in each of them there is provided a framework having intersecting members, which members are variously formed to adapt them for integral union, electrically, at their places of intersection.

Figure 24:
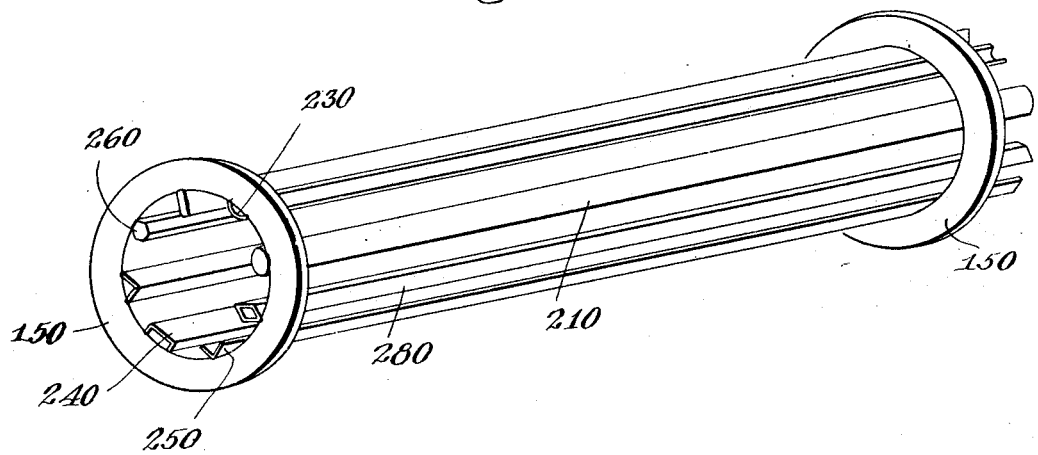
Figure 25:
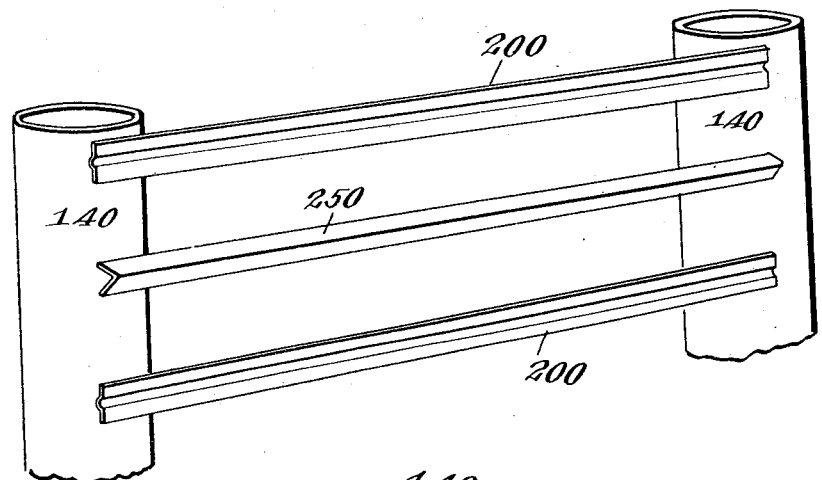
Figure 26:
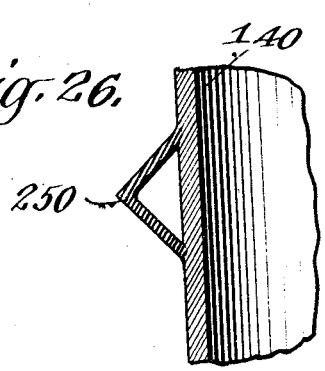

In the drawings: Figure 1 is a perspective view of a frame composed of longitudinal and transverse members, each of a particular form, welded together at their places of intersection with the sides of the transverse members united to the edges of the longitudinal members. Fig. 2 is a similar view, illustrating a further example of a frame composed of long dinal members having their edges united to the sides of transverse members, the latter being specifically of different form from those of the preceding figure. Fig. 3 is a similar view illustrating a further example of such a frame, the longitudinal member in this example being flat or plane and the transverse members similar to those of Fig. 1 and united to both the upper and lower edges of the longitudinal member. Fig. 4 is a cross section on the line 4—4 of Fig. 1. Fig. 5 is a detail view of a further form of transverse member which may be employed with any of the herein described longitudinal members. Fig. 6 is a detail view showing still another form of transverse member adapted for any of the longitudinal members. Fig. 7 is a perspective view of a frame composed of longitudinal members united edgewise to the edges of transverse members, the latter being shown as of form similar to those of Fig. 6 but in inverted position. Fig. 8 is a cross section on the line 8—8 of Fig. 7, intended to show the form of parts at the weld after the weld has been made. Fig. 9 is a perspective view illustrative of a form of longitudinal member different from those of the preceding figures, showing one arrangement of the same with respect to the transverse members. Fig. 10 is a similar view showing members of the same form as those of Fig. 9, and illustrating a different arrangement of the longitudinal members with respect to the transverse members. Fig. 11 is a detail view intended particularly to illustrate the embedding of the transverse members in the longitudinal members of the form shown in Fig. 10, which embedding occurs in the process of welding these parts together. Fig. 12 is a perspective view showing a different form of longitudinal members, exemplified in this figure as united to transverse members of like form. Fig. 13 is a section on the line 13—13 of Fig. 12. Fig. 14 is a detail perspective view of a longitudinal member like that of Fig. 12, united to a transverse member of polygonal form in cross section. Fig. 15 is a view similar to Fig. 14 but shows the longitudinal member of the latter figure united to a transverse member of round-bar form. Fig. 16 is a similar view exemplifying the longitudinal members of Fig. 12 united to transverse members like those of Fig. 1. Fig. 17 is a perspective view illustrating still another form of longitudinal members, exemplified in this figure as united to transverse members of like form. Fig. 18 is a detail section view on the line 18—18 of Fig. 17. Fig. 19 is a view similar to Fig. 18, showing members of the same form as those of the latter, but differently arranged. Fig. 20 is a similar view exemplifying a further suitable arrangement of members of said form. Fig. 21 also is a similar view, but it exemplifies the longitudinal members of Figs. 17–20 inclusive, united to transverse members of polygonal form. Fig. 22 also is a similar view, showing the longitudinal member of Fig. 19 united to a transverse member similar to those of Fig. 1. Fig. 23 is a view like Fig. 22, but shows transverse members at both top and bottom of the longitudinal member. Fig. 24 is a perspective view illustrating a desirable form of frame for towers, or as a reinforcement for concrete columns, pipes or the like, showing several typical examples of members which may be employed herein. Fig. 25 is a perspective illustrative of tubular members showing the same united by transverse members of different forms. Fig. 26 is a detail sectional view illustrative of the edgewise embedding of one member in the side of the other, at their places of contact.

In certain of the figures of drawing hereinbefore referred to, there is shown an open frame or fabric composed of members which are suitably prepared for integral union, electrically, at their places of intersection. In the formation of the frame or fabric, these members are placed in contact with each other in such relation that a plurality of longitudinal members, suitably spaced apart will be joined to each other by other members which similarly are suitably spaced. After the members have been thus disposed, a welding current of electricity is passed through their junction and they are pressed together, in a suitable manner and by suitable means, such as those now well known in the art, for example. The preparation of the members referred to, involves a relative shaping such that the heat will be localized at the place for union and said members will be brought to a welding condition at said place, so that by the pressure step the molecules of the two members at the place referred to will coalesce and the members will be welded to each other before the current has been dissipated. This may be done, according to the present invention, by so preparing the members that one of the same will present its edge or equivalent to the other, and said other will present an edge or other surface portion to the first, suitable for union electrically with the latter.

In the accompanying drawings, a number of different forms of members suitable for union with each other, according to the present invention, are illustrated and these drawings also illustrate various open frames or fabrics produced according to the present invention, each comprising a series of spaced intersecting members integrally united with each other at their places of intersection, electrically.

For the purpose of clearness in the following description, and in order to distinguish the members from each other, those which extend in one direction in the frame or fabric will be hereinafter referred to as "primary members" while the others will be called "secondary members." It will be understood that these terms are employed only for the purpose indicated and not to indicate a relative value of the members in the completed fabric.

As already stated, the primary members may be of various forms and the secondary members also may be of various forms.

In Figs. 1 and 2, primary members, marked 100, of angle iron form are shown. These are exemplified as being of inverted T-shape and as composed of two L-irons arranged with their vertical members 101 in contact with each other and riveted or welded together at places marked 102, or may be rolled in one piece. In Figs. 3 and 7 the primary members, marked 110, are shown as being formed of plane or flat strips. In Figs. 9, 10, 11, 17, 18, 19, 20, 21, 22 and 23 the primary members, marked 120, are each shown as being composed of an angle iron whose elements are so disposed as to form a member approximately of V-shape. In Figs. 12, 13, 14, 15 and 16 the primary members, marked 130, are shown as being formed of channel irons, each with a plane or flat bottom 131 and flanges 132 extending upward from opposite edges thereof. In Figs. 25 and 26, these members, marked 140, are shown as being of tubular form; in Fig. 24, primary members, marked 150, of ring shape are illustrated.

In Figs. 1, 3, 4, 16, 22, 23 and 25, secondary members, marked 200, are shown as being composed, each, of longitudinally extending wings or flanges 201 disposed on opposite sides of a longitudinal channel 202 having a concavo-convex wall extending beyond the plane of the wings. In Figs. 2, 9, 10, 11, 15 and 24 secondary members, marked 210, are shown as formed of round bars; while in Fig. 5 a secondary member formed of a half-round bar, marked 220, is indicated. In Figs. 6, 7, 8 and 24, secondary members, marked 230, of half-cylindrical form are shown. In Figs. 12, 13 and 24 secondary members, marked 240, composed of channel irons, of shape similar to the primary members marked 130 are illustrated; while in Figs. 17, 18, 19, 20, 24 and 25 secondary members, marked 250, similar in shape to the primary members 120 are illustrated. In Figs. 14 and 24 secondary members, marked 260 formed of a bar hexagonal in cross section is illustrated, and in Fig. 21 a secondary member 270 formed of a bar which is square in cross section is shown. In Fig. 24 a secondary member, marked 280, like that marked 270, but hollow, is illustrated.

It will be noted from the foregoing that the members referred to may be made of angles of different shapes, exemplified herein as T-shape, L-shape and V-shape, respectively; of channels of different shapes, exemplified herein as segments of tubes, and as having a flat or plane bottom with side wings rising approximately at right angles therefrom, respectively; of bars, exemplified herein as round, half-round and different shapes of polygons, respectively, and either solid or hollow; flat strips; a plate or strip formed to provide flanges and a longitudinal channel between the flanges and having its wall projecting beyond the plane of the surfaces of the flanges, and of cylindrical and annular shapes, respectively. Considered from another point of view certain of these members may be described as segments of tubes of different shapes, annular and round. Thus the members marked 130 and 240 are segments of approximately square tubes divided longitudinally on a plane between the corners thereof; while the members marked 120 and 250 are segments of approximately square tubes divided in the plane of opposite corners, and the members 230 are segments of cylindrical tubes. Again, many of them, including those, marked 120 and 250, which primarily are analogous in form to angle irons, as well as others, as 230, which are segments of tubes, and still others of various shapes, as the members 200, 130 and 240, for example, form, in the exemplified arrangements, members having longitudinal openings or channels. These members may be variously combined. In Fig. 1 an open frame or fabric is shown as composed of a pair of primary members 100 and a series of secondary members 200. The secondary members are disposed suitable distances apart along the length of the primary members and between the latter, with their channels 202 in contact with the upper edges of the elements 101 of the primary member.

In Fig. 2 a frame is shown as being composed of primary members 100 and secondary members 210 engaging the upper edges of the primary members. In Fig. 3 primary members 110 are shown as being associated with secondary members 200, disposed above and below the edges of said primary members and having their channeled portions 202 in contact with the latter. In Fig. 7 primary members 110 are shown combined with secondary members 230 arranged above and below the same and engaging the edges thereof. In Fig. 10 primary members 120 are shown as associated with secondary members 210, the relative position of the parts being such that the closed sides of the primary members are presented to the secondary members; while in Fig. 9 similar primary and secondary members are shown but the position of the primary members is reversed, that is to say, their open sides are presented to the secondary members. In Fig. 12 a frame composed of primary members 130 and secondary members 240 is illustrated; while in Fig. 14 said primary members 130 are shown as combined with secondary members 260 and in Fig. 15 they are shown as combined with secondary members 210 and in Fig. 16 they are shown as combined with secondary members 200. In Fig. 17 primary members are shown with secondary members 250, with their edges in contact and their open sides presented toward each other; while in Fig. 20 primary members 120 and secondary members 250 are shown in a combination wherein the closed sides of these members are presented to each other. In Fig. 22 a desirable combination of primary members 120 and secondary members 200 is indicated, and in Fig. 23 another combination of the same members is suggested; while in Fig. 21 there is indicated a further combination which includes the primary members 120, but shows it combined with secondary members 270. In Fig. 24 a frame composed of a number of different members is indicated, including primary members 150 with various different forms of secondary members; and in Fig. 25 there is further indicated the possibility of utilizing different forms of secondary members in the same structure. Fig. 25 also shows primary members of tubular form. It may be here stated that various other combinations of primary and secondary members may be made and various forms of primary and secondary members may be embodied in a single structure, and they may be variously relatively disposed, according to peculiar requirements. For this reason, and as already stated, the illustrated embodiments are intended merely to be suggestive, and not restrictive.

In each exemplified embodiment of the invention each member is of a form which may be readily produced and in each illustrated embodiment the members present to each other surfaces capable of being welded together, without embodying what are specifically known as spots or ribs on said surfaces. Thus, in each case the contacting surfaces are such that they will be brought to a suitable elastic welding condition before the current has been dissipated, which dissipation occurs when the bodies of the members have been brought into electrical contact. In practice, members suitably prepared with reference to each other are placed in contact, and a welding current of electricity is passed through their intersecting portions and said portions are subjected to pressure. The action of the current is such as to cause the portion of one member which is in contact with another to be brought to a plastic or welding condition and the surface portion of said other to be in plastic or welding condition, so that the molecules of the intersecting portions of the members will coalesce, this being aided by the pressure. The coalescing to a certain extent is a superficial one, but in each of the herein exemplified embodiments the relative forms of the members are such that one will be partly embedded in the other. When this occurs the current is dissipated as hereinbefore set forth and the welding operation has then been completed. The embedding of one member into another at the place of intersection is clearly indicated in several of the foregoing figures, and particularly in Figs. 4, 7, 8, 11, 12, 18 and 19 in each of which views a seat is clearly shown as formed in one member, engaged by the other member.

Having now described the invention what is believed to be new and desire to secure by Letters Patent, is:—

1. The process hereindescribed of producing an open frame or fabric, which consists in relatively preparing primary and secondary members, so that a portion of one will be embedded and welded in another when they are subjected to a welding current of electricity and pressure, placing them in contact with each other, and passing a current through their junction and subjecting them to pressure.

2. The process hereindescribed of producing an open frame or fabric, which consists in suitably preparing members to provide longitudinal channels or openings therein, placing other suitably prepared members in contact therewith in such position that they will intersect the plane of the channeled portion thereof, and passing a welding current of electricity through the junction of the members and subjecting the same to pressure.

3. The process hereindescribed of producing an open frame or fabric which consists in suitably preparing primary and secondary members, placing them together with an edge of one in contact with and intersected by the surface of the other, and passing a welding current of electricity through the junction of the members and subjecting the same to pressure.

In witness whereof I have hereunto set my hand at the city, county and State of New York, this 9th day of August, 1910.

LAURENCE S. LACHMAN.

In presence of—
J. V. ELLINGBLY,
ISABEL R. RICHARDS.